United States Patent
Bewlay (10) Patent No.: US 9,095,893 B2
(45) Date of Patent: Aug. 4, 2015

(54) METHODS FOR CASTING TITANIUM AND TITANIUM ALUMINIDE ALLOYS

(71) Applicant: GENERAL ELECTRIC COMPANY, Schenectady, NY (US)

(72) Inventor: Bernard Patrick Bewlay, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/512,903

(22) Filed: Oct. 13, 2014

(65) Prior Publication Data

US 2015/0040801 A1 Feb. 12, 2015

Related U.S. Application Data

(62) Division of application No. 13/284,312, filed on Oct. 28, 2011, now Pat. No. 8,858,697.

(51) Int. Cl.
| | |
|---|---|
| *B22C 1/00* | (2006.01) |
| *B22D 21/00* | (2006.01) |
| *C04B 28/06* | (2006.01) |
| *B22C 1/18* | (2006.01) |
| *C04B 111/00* | (2006.01) |

(52) U.S. Cl.
CPC . *B22C 1/00* (2013.01); *B22C 1/181* (2013.10); *B22D 21/005* (2013.01); *C04B 28/06* (2013.01); *C04B 2111/00939* (2013.01)

(58) Field of Classification Search
CPC ............ B22C 1/00; B22C 1/06; B22C 1/181; B22C 9/02; B22C 9/04; B22D 21/005
USPC ............ 164/516–529; 106/38.2, 38.22, 38.27
See application file for complete search history.

(56) References Cited

U.S. PATENT DOCUMENTS

| | | | |
|---|---|---|---|
| 2,912,341 A | 11/1959 | Ricker | |
| 5,143,777 A | 9/1992 | Mills | |
| 5,632,326 A | 5/1997 | Gough | |
| 7,389,809 B2 | 6/2008 | Renkel et al. | |
| 2011/0192324 A1* | 8/2011 | Knevels | ........................ 106/691 |
| 2011/0203761 A1 | 8/2011 | Renkel | |

FOREIGN PATENT DOCUMENTS

| | | |
|---|---|---|
| CN | 1121328 A | 4/1996 |
| CN | 1863621 A | 11/2006 |
| EP | 0539317 A1 | 4/1993 |

(Continued)

OTHER PUBLICATIONS

Chotard et al., "Application of X-ray Computed Tomography to Characterise the Early Hydration of Calcium Aluminate Cement", Cement & Concrete Composites, vol. No. 25, Issue No. 1, pp. 145-152, 2003.
Unofficial English Translation of Chinese Office Action issued in connection with corresponding CN Application No. 201280052944.2 on Feb. 4, 2015.

(Continued)

*Primary Examiner* — Kevin E Yoon
(74) *Attorney, Agent, or Firm* — Scott J. Asmus (57) ABSTRACT

The disclosure relates generally to mold compositions and methods of molding and the articles so molded. More specifically, the disclosure relates to mold compositions and methods for casting titanium-containing articles, and the titanium-containing articles so molded.

23 Claims, 6 Drawing Sheets

(56) References Cited

FOREIGN PATENT DOCUMENTS

| | | | |
|---|---|---|---|
| GB | 2372038 | A | 8/2002 |
| JP | 01262041 | A | 10/1989 |
| JP | 0318448 | A | 1/1991 |
| WO | 2011004239 | A2 | 1/2011 |

OTHER PUBLICATIONS

Unofficial English translation of Office Action issued in connection with corresponding JP Application No. 2014-537125 on Apr. 28, 2015.

Parker et al., "Refractory Calcium Aluminate Cements", Advances in Applied Ceramics, vol. No. 81, pp. 35-42, 1982.

* cited by examiner

700
- 705 — COMBINING CALCIUM ALUMINATE WITH A LIQUID TO PRODUCE A SLURRY OF CALCIUM ALUMINATE IN THE LIQUID
- 710 — INTRODUCING THE SLURRY INTO A MOLD CAVITY THAT CONTAINS A FUGITIVE PATTERN
- 715 — ALLOWING THE SLURRY TO CURE IN THE MOLD CAVITY TO FORM A MOLD OF A TITANIUM–CONTAINING ARTICLE

FIG.7b

700
- 725 — OBTAINING AN INVESTMENT CASTING MOLD COMPOSITION COMPRISING CALCIUM ALUMINATE AND ALUMINUM OXIDE
- 730 — POURING SAID INVESTMENT CASTING MOLD COMPOSITION INTO A VESSEL CONTAINING A FUGITIVE PATTERN
- 735 — CURING SAID INVESTMENT CASTING MOLD COMPOSITION
- 740 — REMOVING SAID FUGITIVE PATTERN FROM THE MOLD
- 745 — PREHEATING THE MOLD TO A MOLD CASTING TEMPERATURE
- 750 — POURING MOLTEN TITANIUM OR TITANIUM ALLOY INTO THE HEATED MOLD
- 755 — SOLIDIFYING THE MOLTEN TITANIUM OR TITANIUM ALLOY AND FORMING A SOLIDIFIED TITANIUM OR TITANIUM ALLOY CASTING
- 760 — REMOVING THE SOLIDIFIED TITANIUM OR TITANIUM ALLOY CASTING FROM THE MOLD

METHODS FOR CASTING TITANIUM AND TITANIUM ALUMINIDE ALLOYS

CROSS-REFERENCE TO RELATED APPLICATION

This application is a divisional application of U.S. application Ser. No. 13/284,312, filed on Oct. 28, 2011, and issued on Oct. 14, 2014 as U.S. Pat. No. 8,858,697, which is incorporated herein by reference in its entirety.

BACKGROUND

Modern gas or combustion turbines must satisfy the highest demands with respect to reliability, weight, power, economy, and operating service life. In the development of such turbines, the material selection, the search for new suitable materials, as well as the search for new production methods, among other things, play an important role in meeting standards and satisfying the demand.

The materials used for gas turbines may include titanium alloys, nickel alloys (also called super alloys) and high strength steels. For aircraft engines, titanium alloys are generally used for compressor parts, nickel alloys are suitable for the hot parts of the aircraft engine, and the high strength steels are used, for example, for compressor housings and turbine housings. The highly loaded or stressed gas turbine components, such as components for a compressor for example, are typically forged parts. Components for a turbine, on the other hand, are typically embodied as investment cast parts.

Although investment casting is not a new process, the investment casting market continues to grow as the demand for more intricate and complicated parts increase. Because of the great demand for high quality, precision castings, there continuously remains a need to develop new ways to make investment castings more quickly, efficiently, cheaply and of higher quality.

Conventional investment mold compounds that consist of fused silica, cristobalite, gypsum, or the like, that are used in casting jewelry and dental prostheses industries are generally not suitable for casting reactive alloys, such as titanium alloys. One reason is because there is a reaction between mold titanium and the investment mold.

There is a need for a simple investment mold that does not react significantly with titanium and titanium aluminide alloys. Approaches have been adopted previously with ceramic shell molds for titanium alloy castings. In the prior examples, in order to reduce the limitations of the conventional investment mold compounds, several additional mold materials have been developed. For example, an investment compound was developed of an oxidation-expansion type in which magnesium oxide or zirconia was used as a main component and metallic zirconium was added to the main constituent to compensate for the shrinkage due to solidification of the cast metal. There is thus also a need for simple and reliable investment casting methods which allow easy extraction of near-net-shape metal or metal alloys from an investment mold that does not react significantly with the metal or metal alloy.

SUMMARY

Aspects of the present disclosure provide casting mold compositions, methods of casting, and cast articles that overcome the limitations of the conventional techniques. Though some aspect of the disclosure may be directed toward the fabrication of components for the aerospace industry, for example, engine turbine blades, aspects of the present disclosure may be employed in the fabrication of any component in any industry, in particular, those components containing titanium and/or titanium alloys.

One aspect of the present disclosure is a mold composition for casting a titanium-containing article, comprising: a calcium aluminate cement comprising calcium monoaluminate, calcium dialuminate, and mayenite. In one embodiment, the mold composition further comprises hollow particles of aluminum oxide. Another aspect of the present disclosure is a titanium-containing article casting-mold composition comprising calcium aluminate. For instance, an aspect of the present disclosure may be uniquely suited to providing mold compositions to be used in molds for casting titanium-containing and/or titanium alloy-containing articles or components, for example, titanium containing turbine blades. In one aspect, the casting-mold composition may further comprise aluminum oxide, for example, aluminum oxide particles that are less than about 10000 microns in outside dimension. In another embodiment, the aluminum oxide comprises particles that may have outside dimensions that range from about 10 microns [µm] to about 10,000 microns.

In one embodiment, the aluminum oxide in the mold composition may comprise from about 0.5% by weight to about 80% by weight of the mold composition. In another aspect, the aluminum oxide may comprise from about 40% by weight to about 60% by weight of the casting-mold composition. In another aspect, the aluminum oxide may comprise from about 40% by weight to about 68% by weight of the casting-mold composition. In yet another embodiment, the aluminum oxide is in the form of hollow particles comprising about 99% by weight of aluminum oxide and may have about 10000 microns or less in outside dimension.

In one embodiment, the calcium aluminate in the casting-mold composition may be provided in the form of a calcium aluminate cement, for example, as a calcium aluminate cement comprising calcium monoaluminate, calcium dialuminate, and mayenite. In one aspect, the volume fraction of calcium monoaluminate is 0.05-0.95, the volume fraction of calcium dialuminate is 0.05-0.80, and the volume fraction of mayenite is 0.01-0.30. In one embodiment, the calcium monoaluminate comprises a volume fraction of about 0.1 to about 0.8; the calcium dialuminate comprises a volume fraction of about 0.1 to about 0.6; and the mayenite comprises a volume fraction of about 0.01 to about 0.2. In yet another embodiment, the volume fraction of calcium monoaluminate in the calcium aluminate cement is more than about 0.5, and the volume fraction of mayenite in the calcium aluminate cement is less than about 0.15. In one embodiment, the calcium aluminate cement has a particle size of about 50 microns or less. In another embodiment, the calcium aluminate cement is more than 30% by weight of the casting-mold composition.

In one embodiment, the casting-mold composition further comprises oxide particles, for example, aluminum oxide particles, magnesium oxide particles, calcium oxide particles, zirconium oxide particles, titanium oxide particles, and/or silicon oxide particles, or combinations thereof. In another embodiment, the oxide particles may be hollow oxide particles. In one embodiment, the hollow oxide particles may be hollow alumina (that is, aluminum oxide) spheres. In one embodiment, the casting-mold composition may further include calcium oxide. According to one embodiment of the disclosure, the calcium oxide in the calcium aluminate cement may be greater than about 10% by weight and less than about 50% by weight of the casting-mold composition. For example, the calcium oxide may be greater than about 30% by weight and less than about 50% by weight of the casting-mold composition,—or the calcium oxide may be greater than about 25% by weight and less than about 35% by weight of the casting-mold composition.

In one embodiment, the casting-mold composition may be used in an investment casting-mold, for example, aspects of the disclosure may be used in investment casting-mold compositions for molds that provide "near-net-shape" components, for instance, near-net-shape, titanium-containing turbine blades, and the like. In one embodiment, an investment casting-mold composition is provided for casting near-net-shape titanium aluminide articles, for example, near-net-shape titanium aluminide turbine blades.

One aspect of the present disclosure is a method for forming a casting mold for casting a titanium-containing article. This method may typically comprise: combining calcium aluminate with a liquid, for example, water, to produce a slurry of calcium aluminate in the liquid; introducing the slurry into a mold cavity that contains a fugitive pattern; and allowing the slurry to cure in the mold cavity to form a mold, for example, a mold for casting a titanium-containing article. In one embodiment, the method may further include, before introducing the slurry into the mold cavity, introducing oxide particles to the slurry. The mold formed may be a green mold, that is, an uncured mold, and the method may further comprise firing the green mold.

In another embodiment, the casting mold formed may be an investment casting mold, for example, for investment casting a titanium-containing article. In one embodiment, the titanium-containing article comprises a titanium aluminide article, for example, a near-net-shape titanium aluminide article, for instance, a near-net-shape titanium aluminide turbine blade.

In addition, one aspect of the present disclosure is a mold formed from the casting-mold composition recited herein. That is, in one embodiment, the disclosure is directed to a mold formed from casting-mold composition comprising calcium aluminate cement. Another aspect of the present disclosure is directed to a titanium-containing article formed in the aforementioned mold.

In yet a further embodiment, the article comprises a metallic article, for example, a titanium-containing metallic article. In one aspect, the article comprises a titanium aluminide turbine blade. In yet another embodiment, the article comprises a near-net-shape, titanium aluminide turbine blade requiring little or no material removal prior to installation.

One aspect of the present disclosure is directed to a casting method for titanium and titanium alloys comprising: obtaining an investment casting-mold composition comprising calcium aluminate and aluminum oxide; pouring said investment casting-mold composition into a vessel containing a fugitive pattern; curing said investment casting-mold composition; removing said fugitive pattern from the mold; preheating the mold to a mold casting temperature; pouring molten titanium or titanium alloy into the heated mold; solidifying the molten titanium or titanium alloy and forming a solidified titanium or titanium alloy casting; and removing the solidified titanium or titanium alloy casting from the mold.

In one embodiment, between removing said fugitive pattern from the mold and preheating the mold to a mold casting temperature, the mold may first be heated to a temperature of about 450 degrees Celsius to about 900 degrees Celsius, and then cooled to room temperature. In one embodiment, the curing step is conducted at temperatures below about 30 degrees Celsius for between one hour to forty-eight hours. In another embodiment, the removing of the fugitive pattern comprises melting, dissolution, ignition, oven dewaxing, furnace dewaxing, steam autoclave dewaxing, or microwave dewaxing. In one embodiment, after the solidified casting is removed from the mold, the casting may be inspected by X-ray or Neutron radiography.

One aspect of the present disclosure is directed to a titanium or titanium alloy article made by the casting method as recited herein. That is, in one embodiment, the disclosure is directed to a titanium or titanium alloy made by the casting method comprising: obtaining an investment casting mold composition comprising calcium aluminate and aluminum oxide; pouring the investment casting mold composition into a vessel containing a fugitive pattern; curing the investment casting mold composition; removing the fugitive pattern from the mold; preheating the mold to a mold casting temperature; pouring molten titanium or titanium alloy into the heated mold; solidifying the molten titanium or titanium alloy; and removing a solidified titanium or titanium alloy from the mold.

One aspect of the present disclosure is directed to a turbine blade comprising titanium or titanium alloy and having an average roughness, Ra, of less than about 20 across at least a portion of its surface area.

These and other aspects, features, and advantages of this disclosure will become apparent from the following detailed description of the various aspects of the disclosure taken in conjunction with the accompanying drawings.

BRIEF DESCRIPTION OF THE FIGURES

The subject matter, which is regarded as the invention, is particularly pointed out and distinctly claimed in the claims at the conclusion of the specification. The foregoing and other features and advantages of the disclosure will be readily understood from the following detailed description of aspects of the invention taken in conjunction with the accompanying drawings in which:

DETAILED DESCRIPTION

The present disclosure relates generally to mold compositions and methods of mold making and articles cast from the molds, and, more specifically, to mold compositions and methods for casting titanium-containing articles, and titanium-containing articles so molded.

The manufacture of titanium based components by investment casting of titanium and its alloys in investment shell molds poses problems from the standpoint that the castings should be cast to "near-net-shape." That is, the components may be cast to substantially the final desired dimensions of the component, and require little or no final treatment or machining. For example, some conventional castings may require only a chemical milling operation to remove any alpha case present on the casting. However, any sub-surface ceramic inclusions located below the alpha case in the casting are typically not removed by the chemical milling operation and may be formed due to the reaction between the mold facecoat and any reactive metal in the mold, for example, reactive titanium aluminide.

The present disclosure provides a new approach for casting near-net-shape titanium and titanium aluminide components, such as, turbine blades or airfoils. Embodiments of the present disclosure provide compositions of matter for investment casting molds and casting methods that provide improved titanium and titanium alloy components for example, for use in the aerospace, industrial and marine industry. In some aspects, the mold composition provides a mold that contain phases that provide improved mold strength during mold making and/or increased resistance to reaction with the casting metal during casting. The molds according to aspects of the disclosure may be capable of casting at high pressure, which is desirable for near-net-shape casting methods. Mold compositions, for example, containing calcium aluminate cement and alumina particles, and preferred constituent phases, have been identified that provide castings with improved properties.

In one aspect, the constituent phases of the mold comprise calcium monoaluminate ($CaAl_2O_4$). The present inventors found calcium monoaluminate desirable for at least two reasons. First, it is understood by the inventors that calcium monoaluminate is believed to promote hydraulic bond formation between the cement particles during the initial stages of mold making, and this hydraulic bonding is believed to provide mold strength during mold construction. Second, it is understood by the inventors that calcium monoaluminate experiences a very low rate of reaction with titanium and titanium aluminide based alloys. In a certain embodiment, calcium monoaluminate is provided to the mold composition of the present disclosure, for example, the investment molds, in the form of calcium aluminate cement. In one aspect, the mold composition comprises a mixture of calcium aluminate cement and alumina, that is, aluminum oxide.

In one aspect of the disclosure, the mold composition provides minimum reaction with the alloy during casting, and the mold provides castings with the required component properties. External properties of the casting include features such as shape, geometry, and surface finish. Internal properties of the casting include mechanical properties, microstructure, defects (such as pores and inclusions) below a specified size and within allowable limits.

The mold composition of one aspect of the present disclosure provides for low-cost casting of titanium alumnide (TiAl) turbine blades, for example, TiAl low pressure turbine blades. The mold composition may provide the ability to cast near-net-shape parts that require less machining and/or treatment than parts made using conventional shell molds and gravity casting. As used herein, the expression "near-net-shape" implies that the initial production of an article is close to the final (net) shape of the article, reducing the need for further treatment, such as, extensive machining and surface finishing. As used herein, the term "turbine blade" refers to both steam turbine blades and gas turbine blades.

Accordingly, the present disclosure addresses the challenges of producing a mold, for example, an investment mold, that does not react significantly with titanium and titanium aluminide alloys. In addition, according to some aspects of the disclosure, the strength and stability of the mold allow high pressure casting approaches, such as centrifugal casting. One of the technical advantages of this disclosure is that, in one aspect, the disclosure may improve the structural integrity of net shape casting that can be generated, for example, from calcium aluminate cement and alumina investment molds. The higher strength, for example, higher fatigue strength, allows lighter components to be fabricated. In addition, components having higher fatigue strength can last longer, and thus have lower life-cycle costs.

Casting Mold Composition

Aspects of the present disclosure provide a composition of matter for investment casting molds that can provide improved components of titanium and titanium alloys. In one aspect of the present disclosure, calcium monoaluminate can be provided in the form of calcium aluminate cement. Calcium aluminate cement may be referred to as a "cement" or "binder." In certain embodiments, calcium aluminate cement is mixed with alumina particulates to provide a castable investment mold mix. The calcium aluminate cement may be greater than about 30% by weight in the castable mold mix. In certain embodiments, the calcium aluminate cement is between about 30% and about 60% by weight in the castable mold mix. The use of greater than 30% by weight of calcium aluminate cement in the castable mold mix (casting mold composition) is a feature of the present disclosure. The selection of the appropriate calcium aluminate cement chemistry and alumina formulation are factors in the performance of the mold. In one aspect, a sufficient amount of calcium oxide may be provided in the mold composition in order to minimize reaction with the titanium alloy.

In one aspect, the mold composition, for example, the investment mold composition, may comprise a multi-phase mixture of calcium aluminate cement and alumina particles. The calcium aluminate cement may function as a binder, for example, the calcium aluminate cement binder may provide the main skeletal structure of the mold structure. The calcium aluminate cement may comprise a continuous phase in the mold and provide strength during curing, and casting. The mold composition may consist of calcium aluminate cement and alumina, that is, calcium aluminate cement and alumina may comprise substantially the only components of the mold composition, with little or no other components. In one embodiment, the present disclosure comprises a titanium-containing article casting-mold composition comprising calcium aluminate. In another embodiment, the casting-mold composition further comprises oxide particles, for example, hollow oxide particles. According to aspects of the disclosure, the oxide particles may be aluminum oxide particles, magnesium oxide particles, calcium oxide particles, zirconium oxide particles, titanium oxide particles, silicon oxide particles, combinations thereof, or compositions thereof.

The casting-mold composition can further include aluminum oxide, for example, in the form of hollow particles, that is, particles having a hollow core or a substantially hollow core substantially surrounded by an oxide. These hollow aluminum oxide particles may comprise about 99% of aluminum oxide and have about 10 millimeter [mm] or less in outside dimension, such as, width or diameter. In one embodiment, the hollow aluminum oxide particles have about 1 millimeter [mm] or less in outside dimension, such as, width or diameter. In certain embodiments, the hollow oxide particles may comprise hollow alumina spheres. The hollow alumina spheres may be incorporated into the casting-mold composition, and the hollow spheres may have a range of geometries, such as, round particles, or irregular aggregates. In certain embodiments, the alumina may include both round particles and hollow spheres. In one aspect, these geometries were found to increase the fluidity of the investment mold mixture. The enhanced fluidity may typically improve the surface finish and fidelity or accuracy of the surface features of the final casting produced from the mold.

The aluminum oxide comprises particles ranging in outside dimension from about 10 microns to about 10,000 microns. In certain embodiments, the aluminum oxide comprises particles that are less than about 500 microns in outside dimension, for example, diameter or width. The aluminum oxide may comprise from about 0.5% by weight to about 80% by weight of the casting-mold composition. Alternatively, the aluminum oxide comprises from about 40% by weight to about 60% by weight of the casting-mold composition. Alternatively, the aluminum oxide comprises from about 40% by weight to about 68% by weight of the casting-mold composition.

In one embodiment, the casting-mold composition further comprises calcium oxide. The calcium oxide may be greater than about 10% by weight and less than about 50% by weight of the casting-mold composition. The final mold typically may have a density of less than 2 grams/cubic centimeter and strength of greater than 500 pounds per square inch [psi]. In one embodiment, the calcium oxide is greater than about 30% by weight and less than about 50% by weight of the casting-mold composition. Alternatively, the calcium oxide is greater than about 25% by weight and less than about 35% by weight of the casting-mold composition.

In a specific embodiment, the casting-mold composition of the present disclosure comprises a calcium aluminate cement. The calcium aluminate cement includes at least three phases or components comprising calcium and aluminum: calcium monoaluminate ($CaAl_2O_4$), calcium dialuminate ($CaAl_4O_7$), and mayenite ($Ca_{12}Al_{14}O_{33}$). The volume fraction of calcium monoaluminate may range from 0.05 to 0.95; the volume fraction of calcium dialuminate may range from 0.05 to 0.80; and the volume fraction of mayenite may range from 0.01 to 0.30. In another example, the volume fraction of calcium monoaluminate comprises a volume fraction of about 0.1 to about 0.8; the calcium dialuminate comprises a volume fraction of about 0.1 to about 0.6; and the mayenite comprises a volume fraction of about 0.01 to about 0.2. The volume fraction of calcium monoaluminate in the calcium aluminate cement may be more than about 0.5, and the volume fraction of mayenite in the calcium aluminate cement may be less than about 0.15. In another embodiment, the calcium aluminate cement is more than 30% by weight of the casting-mold composition.

In one embodiment, the calcium aluminate cement has a particle size of about 50 microns or less. A particle size of less than 50 microns is preferred for three reasons: first, the fine particle size is believed to promote the formation of hydraulic bonds during mold mixing and curing; second, the fine particle size is understood to promote inter-particle sintering during firing, and this can increase the mold strength; and third, the fine particle size is believed to improve the surface finish of the cast article produced in the mold. The calcium aluminate cement may be provided as powder, and can be used either in its intrinsic powder form, or in an agglomerated form, such as, as spray dried agglomerates. The calcium aluminate cement can also be preblended with fine-scale (for, example, less than 10 micron in size) alumina. The fine-scale alumina is believed to provide an increase in strength due to sintering during high-temperature firing. In certain instances, larger-scale alumina (that is, greater than 10 micron in size) may also be added with or without the fine-scale alumina.

The hollow alumina particles serve at least two functions: [1] they reduce the density and the weight of the mold, with minimal reduction in strength; strength levels of approximately 500 psi and above are obtained, with densities of approximately 2 g/cc and less; and [2] they reduce the elastic modulus of the mold and help to provide compliance during cool down of the mold and the component after casting. The increased compliance and crushability of the mold may reduce the tensile stresses on the component.

Calcium Aluminate Cement Composition

The calcium aluminate cement used in aspects of the disclosure typically comprises three phases or components of calcium and aluminum: calcium monoaluminate ($CaAl_2O_4$), calcium dialuminate ($CaAl_4O_7$), and mayenite ($Ca_{12}Al_{14}O_{33}$). Calcium mono-aluminate is a hydraulic mineral present in calcium alumina cement. Calcium monoaluminate's hydration contributes to the high early strength of the investment mold. Mayenite is desirable in the cement because it provides strength during the early stages of mold curing due to the fast formation of hydraulic bonds. The mayenite is, however, typically removed during heat treatment of the mold prior to casting.

In one aspect, the initial calcium aluminate cement formulation is typically not at thermodynamic equilibrium after firing in the cement manufacturing kiln. However, after mold making and high-temperature firing, the mold composition moves towards a thermodynamically stable configuration, and this stability is advantageous for the subsequent casting process. In one embodiment, the volume fraction of calcium monoaluminate in the cement is greater than 0.5, and volume fraction of mayenite is less than 0.15. The mayenite is incorporated in the mold because it is a fast setting calcium aluminate and it is believed to provide the mold with strength during the early stages of curing. Curing may be performed at low temperatures, for example, temperatures between 15 degrees Celsius and 40 degrees Celsius because the fugitive wax pattern is temperature sensitive and loses its shape and properties on thermal exposure above about 35 degrees C. It is preferred to cure the mold at temperatures below 30 degrees C.

The calcium aluminate cement may typically be produced by mixing high purity alumina with high purity calcium oxide or calcium carbonate; the mixture of compounds is typically heated to a high temperature, for example, temperatures between 1000 and 1500 degrees C. in a furnace or kiln and allowed to react.

The resulting product, known in the art as cement "clinker," that is produced in the kiln is then crushed, ground, and sieved to produce a calcium aluminate cement of the preferred particle size. Further, the calcium aluminate cement is designed and processed to have a minimum quantity of impurities, such as, minimum amounts of silica, sodium and other alkali, and iron oxide. In one aspect, the target level for the calcium aluminate cement is that the sum of the $Na_2O$, $SiO_2$, $Fe_2O_3$, and $TiO_2$ is less than about 2 weight percent. In one embodiment, the sum of the $Na_2O$, $SiO_2$, $Fe_2O_3$, and $TiO_2$ is less than about 0.05 weight percent.

In one aspect of the disclosure, a calcium aluminate cement with bulk alumina concentrations over 35% weight in alumina ($Al_2O_3$) and less than 65% weight calcium oxide is provided. The maximum alumina concentration of the cement may be about 85% (for example, about 15% CaO). In one embodiment, the calcium aluminate cement is of high purity and contains up to 70% alumina. The volume fraction of calcium monoaluminate may be maximized in the fired mold prior to casting. A minimum amount of calcium oxide may be required to minimize reaction between the casting alloy and the mold. If there is more than 50% calcium oxide in the cement, this can lead to phases such as mayenite and tricalcium aluminate, and these do not perform as well as the calcium monoaluminate during casting. The preferred range for calcium oxide is less than about 50% and greater than about 10% by weight.

As noted above, the three phases in the calcium aluminate cement/binder in the mold are calcium monoaluminate ($CaAl_2O_4$), calcium dialuminate ($CaAl_4O_7$), and mayenite ($Ca_{12}Al_{14}O_{33}$). The calcium monoaluminate in the cement/binder has three advantages over other calcium aluminate phases: 1) The calcium monoaluminate is incorporated in the mold because it has a fast setting response (although not as fast as mayenite) and it is believed to provide the mold with strength during the early stages of curing. The rapid generation of mold strength provides dimensional stability of the casting mold, and this feature improves the dimensional consistency of the final cast component. 2) The calcium monoaluminate is chemically stable with regard to the titanium and titanium aluminide alloys that are being cast. The calcium monoaluminate is preferred relative to the calcium dialuminate, and other calcium aluminate phases with higher alumina activity; these phases are more reactive with titanium and titanium aluminide alloys that are being cast. 3) The calcium monoaluminate and calcium dialuminate are low expansion phases and are understood to prevent the formation of high levels of stress in the mold during curing, dewaxing, and subsequent casting. The thermal expansion behavior of calcium monoaluminate is a close match with alumina.

The Mold and Casting Methods

An investment mold is formed by formulating the investment mix of the ceramic components, and pouring the mix into a vessel that contains a fugitive pattern. The investment mold formed on the pattern is allowed to cure thoroughly to form a so-called "green mold." Typically, curing of the green mold is performed for times from 1 hour to 48 hours. Subsequently, the fugitive pattern is selectively removed from the green mold by melting, dissolution, ignition, or other known pattern removal technique. Typical methods for wax pattern removal include oven dewax (less than 150 degrees C.), furnace dewax (greater than 150 degrees C.), steam autoclave dewax, and microwave dewaxing.

For casting titanium alloys, and titanium aluminide and its alloys, the green mold then is fired at a temperature above 600 degrees C., preferably 700 to 1400 degrees C., for a time period in excess of 1 hour, preferably 2 to 10 hours, to develop mold strength for casting and to remove any undesirable residual impurities in the mold, such as metallic species (Fe, Ni, Cr), and carbon-containing species. The atmosphere of firing the mold is typically ambient air, although inert gas or a reducing gas atmosphere can be used.

The firing process also removes the water from the mold and converts the mayenite to calcium aluminate. Another purpose of the mold firing procedure is to minimize any free silica that remains in the mold prior to casting. Other purposes are to increase the high temperature strength, and increase the amount of calcium monoaluminate and calcium dialuminate.

The mold is heated from room temperature to the final firing temperature, specifically the thermal history is controlled. The heating rate to the firing temperature, and the cooling rate after firing are typically regulated or controlled. If the mold is heated too quickly, it can crack internally or externally, or both; mold cracking prior to casting is highly undesirable. In addition, if the mold is heated too quickly, the internal surface of the mold can crack and spall off. This can lead to undesirable inclusions in the final casting, and poor surface finish, even if there are no inclusions. Similarly, if the mold is cooled too quickly after reaching the maximum temperature, the mold can also crack internally or externally, or both.

The mold composition described in the present disclosure is particularly suitable for titanium and titanium aluminide alloys. The mold composition after firing and before casting can influence the mold properties, particularly with regard to the constituent phases. In one embodiment, for casting purposes, a high volume fraction of calcium monoaluminate in the mold is preferred, for example, a volume fraction of 0.15 to 0.8. In addition, for casting purposes, it is desirable to minimize the volume fraction of the mayenite, for example, using a volume fraction of 0.01 to 0.2, because mayenite is water sensitive and it can provide problems with water release and gas generation during casting. After firing, the mold can also contain small volume fractions of aluminosilicates and calcium aluminosilicates. The sum of the volume fraction of aluminosilicates and calcium aluminosilicates may typically be kept to less than 5% in order to minimize reaction of the mold with the casting.

In certain embodiments, the casting-mold composition of the present disclosure comprises an investment casting-mold composition. The investment casting-mold composition comprises a near-net-shape, titanium-containing metal, investment casting mold composition. In one embodiment, the investment casting-mold composition comprises an investment casting-mold composition for casting near-net-shape titanium aluminide articles. The near-net-shape titanium aluminide articles comprise, for example, near-net-shape titanium aluminide turbine blades.

The selection of the correct calcium aluminate cement chemistry and alumina formulation are factors in the performance of the mold during casting. In terms of the calcium aluminate cement, it may be necessary to minimize the amount of free calcium oxide in order to minimize reaction with the titanium alloy. If the calcium oxide concentration in the cement is less than about 10% by weight, the alloy reacts with the mold because the alumina concentration is too high, and the reaction generates undesirable oxygen concentration levels in the casting, gas bubbles, and a poor surface finish in the cast component. If the calcium oxide concentration in the cement is greater than 50% by weight, the mold can be sensitive to pick up of water and carbon dioxide from the environment. As such, the calcium oxide concentration in the investment mold may typically be kept below 50%. In one embodiment, the calcium oxide concentration in the investment mold is between 10% and 50% by weight. In one embodiment, the calcium oxide concentration in the investment mold is between 15% and 40% by weight. Alternatively, the calcium oxide concentration in the investment mold may be between 25% and 35% by weight.

Carbon dioxide can lead to formation of calcium carbonate in the mold during processing and prior to casting, and calcium carbonate is unstable during the casting operation. Thus, the water and carbon dioxide in the mold can lead to poor casting quality. If the adsorbed water level is too high, for example, greater than 0.05 weight percent, when the molten metal enters the mold during casting, the water is released and it can react with the alloy. This leads to poor surface finish, gas bubbles in the casting, high oxygen concentration, and poor mechanical properties. Similarly, if the carbon dioxide level is too high, calcium carbonate can form in the mold and when the molten metal enters the mold during casting, the calcium carbonate can decompose generating carbon dioxide, which can react with the alloy. The resulting calcium carbonate is less than 1 weight percent in the mold.

Prior to casting a molten metal or alloy, the investment mold typically is preheated to a mold casting temperature that is dependent on the particular component geometry or alloy to be cast. For example, a typical mold preheat temperature is 600 degrees C. Typically, the mold temperature range is 450 degrees C. to 1200 degrees C.; the preferred temperature range is 450 degrees C. to 750 degrees C., and in certain cases it is 500 degrees C. to 650 degrees C.

According to one aspect, the molten metal or alloy is poured into the mold using conventional techniques which can include gravity, countergravity, pressure, centrifugal, and other casting techniques known to those skilled in the art. Vacuum or an inert gas atmospheres can be used. For complex shaped thin wall geometries, techniques that use high pressure are preferred. After the solidified titanium aluminide or alloy casting is cooled typically to less than 650 degrees, for example, to room temperature, it is removed from the mold and finished using conventional techniques, such as, grit blasting, water jet blasting, and polishing.

One aspect of the present disclosure is directed to a casting method for titanium and titanium alloys comprising: obtaining an investment casting-mold composition comprising calcium aluminate and aluminum oxide; pouring said investment casting-mold composition into a vessel containing a fugitive pattern; curing said investment casting-mold composition; removing said fugitive pattern from the mold; preheating the mold to a mold casting temperature; pouring molten titanium or titanium alloy into the heated mold; solidifying the molten titanium or titanium alloy; and removing a solidified titanium or titanium alloy from the mold.

Between removing said fugitive pattern from the mold and preheating the mold to a mold casting temperature, the mold is first heated to a temperature of about 450 degrees C. to about 1200 degrees C., and then cooled to room temperature. In one embodiment, the curing step is conducted at temperatures below about 30 degrees C. for between one hour to 48 hours. The removing of the fugitive pattern includes the step of melting, dissolution, ignition, oven dewaxing, furnace dewaxing, steam autoclave dewaxing, or microwave dewaxing. In one embodiment, after removing of the titanium or titanium alloy from the mold, the casting may be finished with grit blasting, water get blasting, or polishing. After the solidified casting is removed from the mold, it is inspected by X-ray or Neutron radiography.

The solidified casting is subjected to surface inspection and X-ray radiography after casting and finishing to detect any sub-surface inclusion particles at any location within the casting. X-ray radiography is employed to find inclusions that are not detectable by visual inspection of the exterior surface of the casting. The titanium aluminide casting is subjected to X-ray radiography (film or digital) using conventional X-ray equipment to provide an X-ray radiograph that then is inspected or analyzed to determine if any sub-surface inclusions are present within the titanium aluminide casting.

Alternately or in addition to X-ray radiography, the solidified casting can be subjected to other non-destructive testing, for example, conventional Neutron-ray radiography. The mold compositions described provide a small amount of a material having a high Neutron absorption cross section. In one aspect, a Neutron radiograph is prepared of the cast article. Since the titanium alloy cast article may be substantially transparent to neutrons, the mold material will typically show up distinctly in the resulting Neutron radiograph. In one aspect, it is believed that Neutron exposure results in "neutron activation" of the radiographically dense element. Neutron activation involves the interaction of the Neutron radiation with the radiographically dense element of the casting to effect the formation of radioactive isotopes of the radiographically dense elements of the mold composition. The radioactive isotopes may then be detectable by conventional radioactive detecting devices to count any radiographically dense element isotopes present in the cast article.

Another aspect of the present disclosure is a method for forming a casting mold for casting a titanium-containing article. The method includes: combining calcium aluminate with a liquid, such as water, to produce a slurry of calcium aluminate in the liquid; introducing the slurry into a vessel that contains a fugitive pattern; and allowing the slurry to cure in the mold cavity to form a mold of a titanium-containing article. In one embodiment, the method further comprises, before introducing the slurry into a mold cavity, introducing oxide particles, for example hollow oxide particles, to the slurry.

The formed mold may be a green mold, and the method may further comprise firing the green mold. In one embodiment, the casting mold comprises an investment casting mold, for example, for casting a titanium-containing article. In one embodiment, the titanium-containing article comprises a titanium aluminide article. In one embodiment, the investment casting-mold composition comprises an investment casting-mold composition for casting near-net-shape titanium aluminide articles. The near-net-shape titanium aluminide articles may comprise near-net-shape titanium aluminide turbine blades. In one embodiment, the disclosure is directed to a mold formed from a titanium-containing article casting-mold composition, comprising calcium aluminate. Another aspect of the present disclosure is directed to an article formed in the aforementioned mold.

Yet another aspect of the present disclosure is a titanium or titanium alloy casting made by a casting method comprising: obtaining an investment casting mold composition comprising calcium aluminate and aluminum oxide; pouring said investment casting mold composition into a vessel containing a fugitive pattern; curing said investment casting mold composition; removing said fugitive pattern from the mold; preheating the mold to a mold casting temperature; pouring molten titanium or titanium alloy into the heated mold; solidifying the molten titanium or titanium alloy to form the casting; and removing a solidified titanium or titanium alloy casting from the mold.

Surface roughness is one of the important indices representing the surface integrity of cast and machined parts. Surface roughness is characterized by the centerline average roughness value "Ra", as well as the average peak-to-valley distance "Rz" in a designated area as measured by optical profilometry. A roughness value can either be calculated on a profile or on a surface. The profile roughness parameter (Ra, Rq, . . . ) are more common. Each of the roughness parameters is calculated using a formula for describing the surface. There are many different roughness parameters in use, but $R_a$ is by far the most common. As known in the art, surface roughness is correlated with tool wear. Typically, the surface-finishing process though grinding and honing yields surfaces with Ra in a range of 0.1 mm to 1.6 mm. The surface roughness Ra value of the final coating depends upon the desired function of the coating or coated article.

The average roughness, Ra, is expressed in units of height. In the Imperial (English) system, 1 Ra is typically expressed in "millionths" of an inch. This is also referred to as "micro-inches". The Ra values indicated herein refer to microinches. An Ra value of 70 corresponds to approximately 2 microns; and an Ra value of 35 corresponds to approximately 1 micron. It is typically required that the surface of high performance articles, such as turbine blades, turbine vanes/nozzles, turbochargers, reciprocating engine valves, pistons, and the like, have an Ra of about 20 or less. One aspect of the present disclosure is a turbine blade comprising titanium or titanium alloy and having an average roughness, Ra, of less than 15 across at least a portion of its surface area.

As the molten metals are heated higher and higher, they tend to become more and more reactive (e.g., undergoing unwanted reactions with the mold surface). Such reactions lead to the formation of impurities that contaminate the metal parts, which result in various detrimental consequences. The presence of impurities shifts the composition of the metal such that it may not meet the desired standard, thereby disallowing the use of the cast piece for the intended application. Moreover, the presence of the impurities can detrimentally affect the mechanical properties of the metallic material (e.g., lowering the strength of the material).

Furthermore, such reactions can lead to surface texturing, which results in substantial, undesirable roughness on the surface of the cast piece. For example, using the surface roughness value Ra, as known in the art for characterizing surface roughness, cast pieces utilizing stainless steel alloys and/or titanium alloys are typically exhibit an Ra value between about 100 and 200 under good working conditions. These detrimental effects drive one to use lower temperatures for filling molds. However, if the temperature of the molten metal is not heated enough, the casting material can cool too quickly, leading to incomplete filling of the cast mold.

One aspect of the present disclosure is directed to a mold composition for casting a titanium-containing article, comprising calcium aluminate. The mold composition further comprises hollow alumina particles. The article comprises a metallic article. In one embodiment, the article comprises a titanium aluminide-containing article. In another embodiment, the article comprises a titanium aluminide turbine blade. In yet another embodiment, the article comprises a near-net-shape, titanium aluminide turbine blade. This near-net-shape, titanium aluminide turbine blade may require little or no material removal prior to installation.

EXAMPLES

The disclosure, having been generally described, may be more readily understood by reference to the following examples, which are included merely for purposes of illustration of certain aspects and embodiments of the present disclosure, and are not intended to limit the disclosure in any way.

Figure 1:
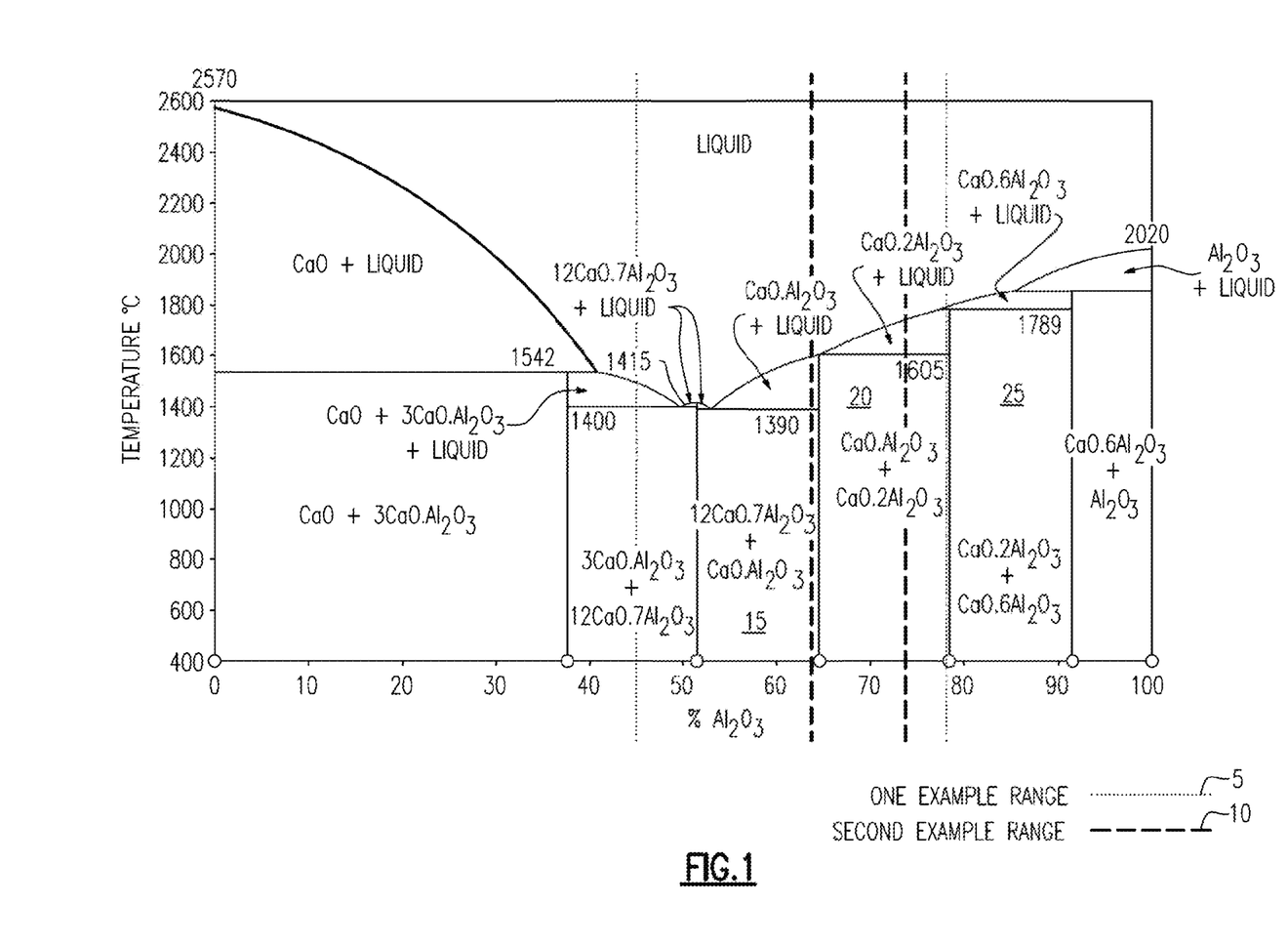
FIG. 1 is a diagram that depicts the percentage of aluminum oxide on the x axis and temperature on the y axis, showing various calcium oxide-aluminum oxide composition ranges for the initial calcium aluminate cements, and shows particular aluminum oxide percentages and temperature ranges for the compositions according to disclosed embodiments.

FIG. 1 is a phase diagram that shows the stable phases as a function of alumina and calcia compositions and temperature. Also shown on the phase diagram are the example composition ranges for the bulk of the mold, according to disclosed embodiments. FIG. 1 depicts the percentage of aluminum oxide on the x axis and temperature on the y axis. One example range 5 shows the example composition ranges and the phases for Mayenite and Calcium monoaluminate 15, Calcium dialuminate and Calcium monoaluminate 20. Another example range 10 shows the example composition ranges and phase primarily including calcium dialuminate and calcium monoaluminate. Outside of both ranges 5, 10 is the calcium dialuminate and calcium hexaluminate 25.

Figure 2A:
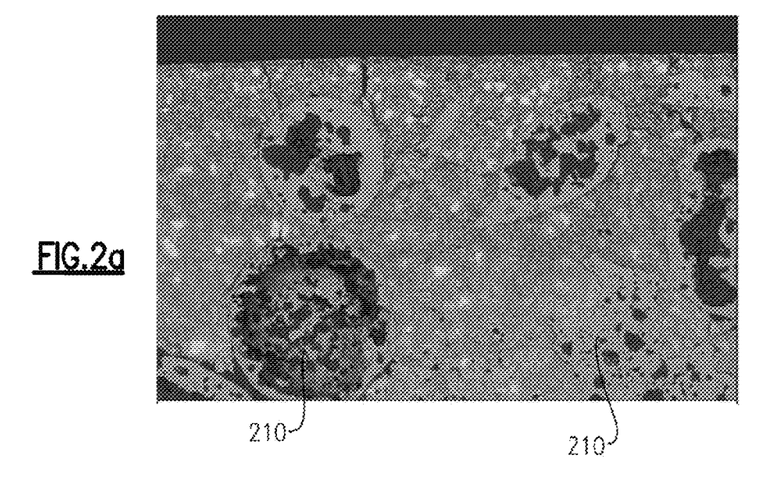
FIGS. 2a and 2b show one example of the mold microstructure after high temperature firing with the backscattered electron imaging scanning electron microscope images of the cross section of the mold fired at 1000 degrees Celsius, wherein FIG. 2a points to the alumina particles present and FIG. 2b points to the calcium aluminate cement.
Figure 2B:
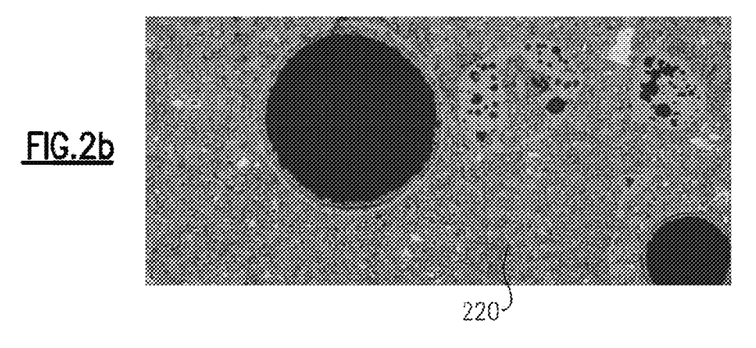

FIGS. 2a and 2b show one example of the mold microstructure after high temperature firing. The backscattered electron scanning electron microscope images of the cross section of the mold fired at 1000 degrees Celsius are shown, wherein FIG. 2a points to the alumina particles 210 present and FIG. 2b points to the calcium aluminate cement 220. The fine-scale calcium aluminate cement 220 provides the skeleton structure of the mold. In one example the calcium aluminate cement comprises calcium monoaluminate and calcium dialuminate.

Figure 3A:
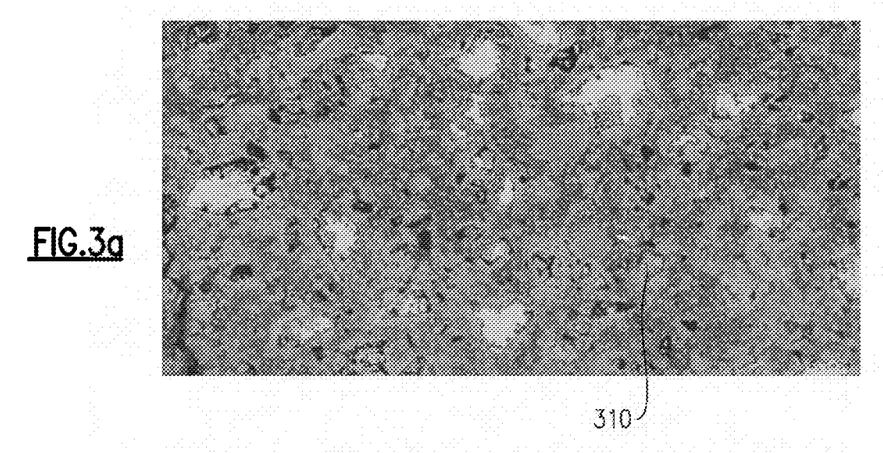
FIG. 3a and FIG. 3b show one example of the mold microstructure after high temperature firing with the backscattered electron imaging scanning electron microscope images of the cross section of the mold fired at 1000 degrees Celsius, wherein FIG. 3a points to calcium aluminate cement and fine-scale alumina particles present and FIG. 3b points to an alumina particle.
Figure 3B:
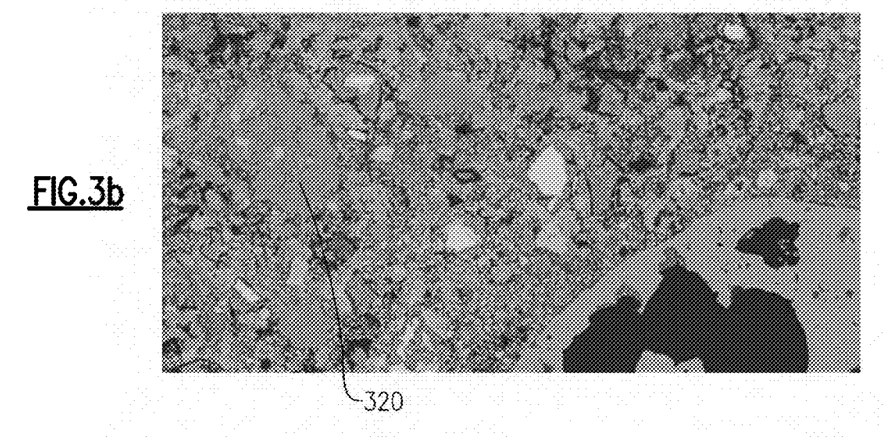

FIG. 3a and FIG. 3b show one example of the mold microstructure after high temperature firing. The backscattered electron scanning electron microscope images of the cross section of the mold fired at 1000 degrees Celsius are shown, wherein FIG. 3a points to calcium aluminate cement and fine-scale alumina particles 310 present and FIG. 3b points to an alumina particle 320.

Figure 4A:
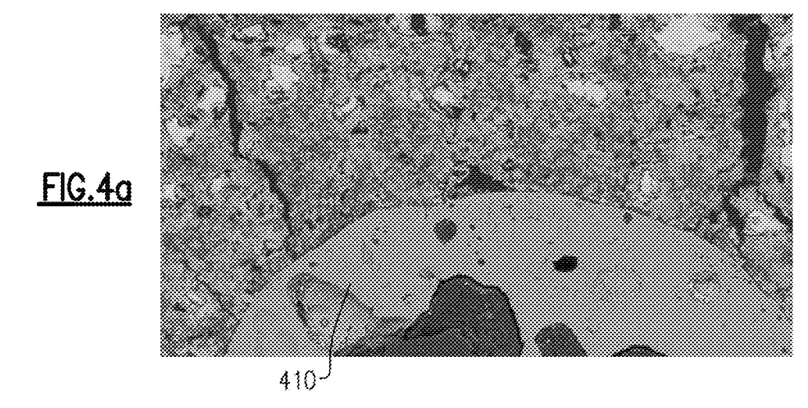
FIG. 4a and FIG. 4b show one example of the mold microstructure after high temperature firing with the backscattered electron imaging scanning electron microscope images of the cross section of the mold fired at 1000 degrees Celsius, wherein FIG. 4a points to a large scale alumina particle and FIG. 4b points to a calcium monoaluminate particle.
Figure 4B:
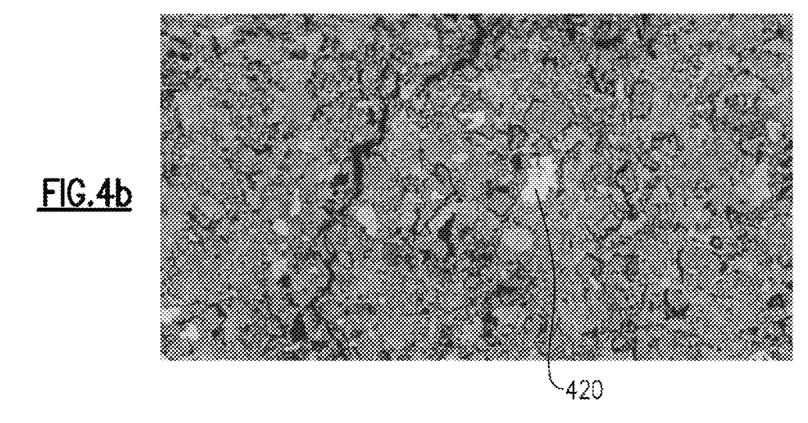

FIG. 4a and FIG. 4b show one example of the mold microstructure after high temperature firing. The backscattered electron scanning electron microscope images of the cross section of the mold fired at 1000 degrees Celsius are shown, wherein FIG. 4a points to a large scale alumina particle 410 and FIG. 4b points to a calcium monoaluminate particle 420. The micrograph shows the fine-scale calcium aluminate cement within the mold. The calcium aluminate cement comprises calcium monoaluminate and calcium dialuminate.

Figure 5:
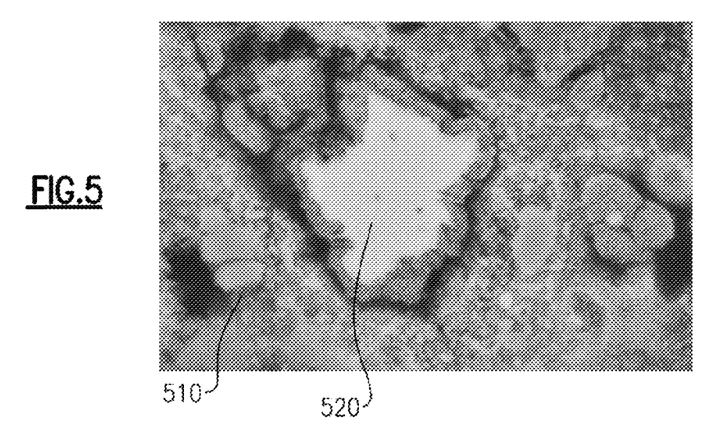
FIGS. 5 and 6 show examples of the mold microstructure after high temperature firing, showing alumina and calcium monoaluminate, wherein the calcium monoaluminate reacts with alumina to form calcium dialuminate, and wherein the mold in one example is fired to minimize mayenite content.
Figure 6:
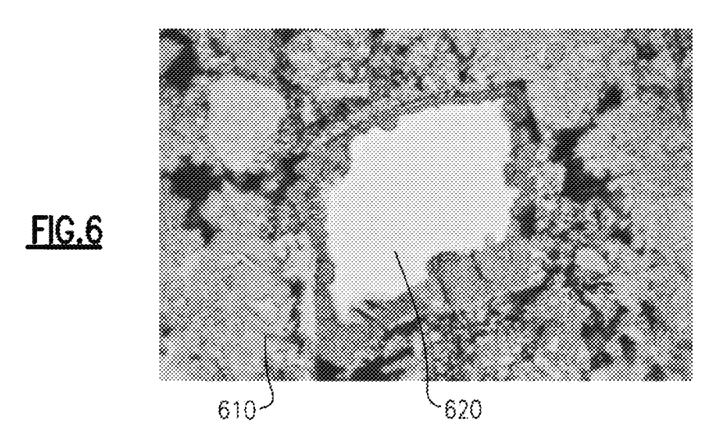

FIGS. 5 and 6 show two examples of the mold microstructure after high temperature firing, showing alumina 510 (in FIG. 5) 610 (in FIG. 6), and calcium monoaluminate 520 (in FIG. 5) 620 (in FIG. 6), wherein the calcium monoaluminate reacts with alumina to form calcium dialuminate, and wherein the mold in one example is fired to minimize mayenite content.

Investment Mold Composition and Formulation

A calcium aluminate cement was mixed with alumina to generate an investment mold mix, and a range of investment mold chemistries were tested. The investment mixture in one example consisted of calcium aluminate cement with 70% alumina and 30% calcia, alumina particles, water, and colloidal silica.

Figure 7A:
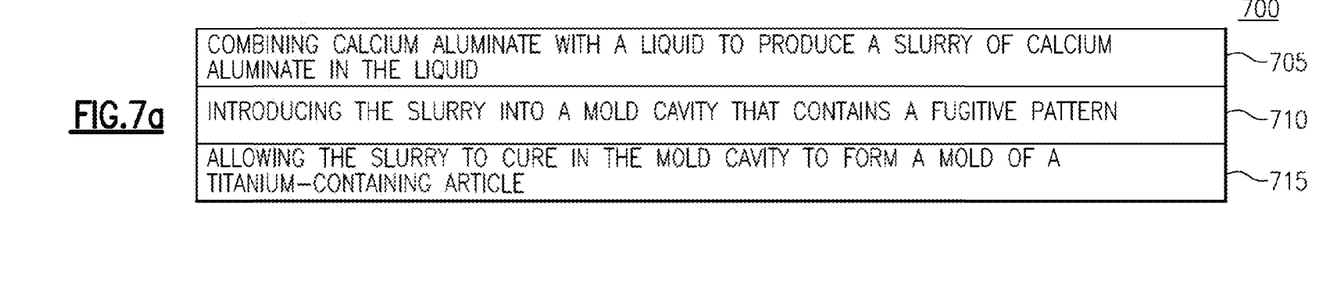
FIG. 7a shows a flow chart, in accordance with aspects of the disclosure, illustrating a method for forming a casting mold for casting a titanium-containing article.

As shown in FIG. 7a, the method comprises combining calcium aluminate with a liquid to produce a slurry of calcium aluminate in the liquid 705. The calcium aluminate slurry is introduced into a mold cavity that contains a fugitive pattern 710. The slurry is allowed to cure in the mold cavity to form a mold of a titanium article 715.

Figure 7B:
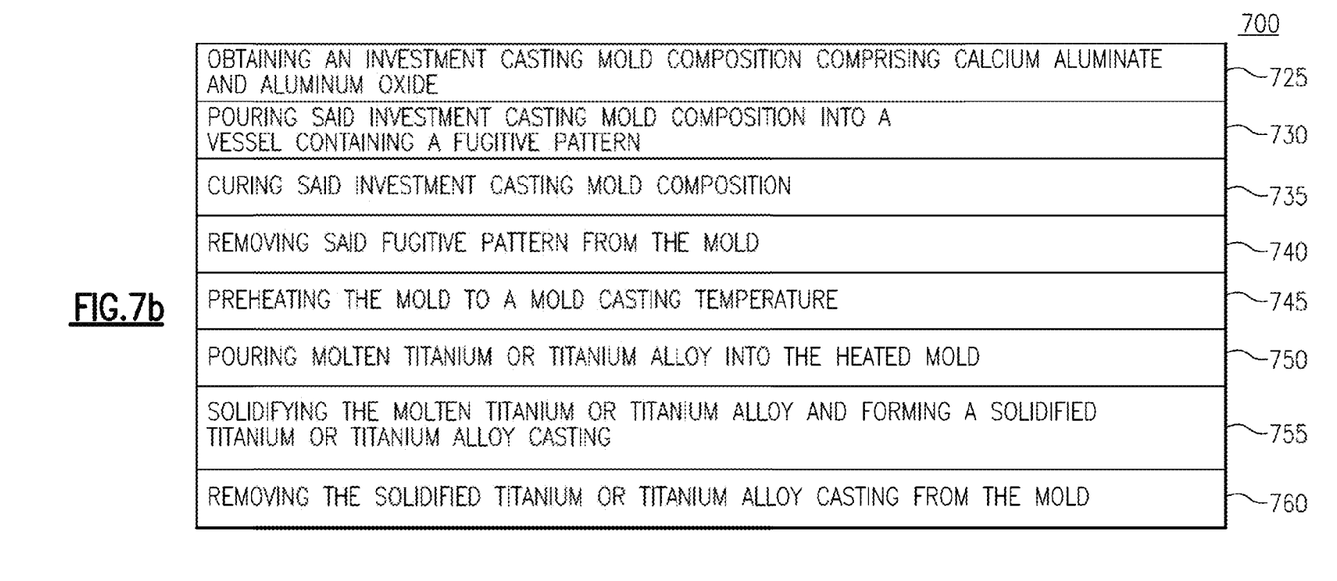
FIG. 7b shows a flow chart, in accordance with aspects of the disclosure, illustrating a casting method for titanium and titanium alloys.

In another example, shown in FIG. 7b, the method comprises obtaining an investment casting mold composition comprising calcium aluminate and aluminum oxide 725. The investment casting mold composition is poured into a vessel containing a fugitive pattern 730. The investment casting is cured thereby casting the mold composition 735, and the fugitive is removed from the mold 740. The mold is preheated to a mold casting temperature 745 and the molten titanium or titanium alloy is poured into the heated mold 750. The molten titanium or titanium alloy is solidified and forms a solidified titanium or titanium alloy casting 755. Finally, the solidified titanium or titanium alloy casting is removed from the mold 760.

In a first example, a typical slurry mixture for making an investment mold consisted of 3000 grams [g] of the calcium aluminate cement, (comprising approximately 10% by weight of mayenite, approximately 70% by weight of calcium monoaluminate, and approximately 20% by weight of calcium dialuminmate), 1500 g of calcined alumina particles with a size of less than 10 microns, 2450 g of high-purity calcined alumina particles of a size range from 0.5-1 mm diameter, 1800 g of deionized water, and 150 g of colloidal silica. The solids-loading of the final mold mix is less than 80%, wherein the solids loading is the total mass solids as a percentage of the total mass of all components in the mix.

Typical high-purity calcined alumina particles types include fused, tabular, and levigated alumina. Typical suitable colloidal silicas include Remet LP30, Remet SP30, Nalco 1030, Ludox. The produced mold was used for casting titanium aluminide-containing articles such as turbine blades with a good surface finish. The roughness (Ra) value was less than 100 microinches, and with an oxygen content of less than 2000 parts per million [ppm]. This formulation produced a mold that was approximately 120 mm diameter and 400 mm long. This formulation produced a mold that had a density of less than 2 grams per cubic centimeter.

The mold mix was prepared by mixing the calcium aluminate cement, water, and colloidal silica in a container. A high-shear form mixing was used. If not mixed thoroughly, the cement can gel. When the cement was in full suspension in the mixture, the fine-scale alumina particles were added. When the fine-scale alumina particles were fully mixed with the cement, the larger-size (for example, 0.5-1.0 mm) alumina particles were added and mixed with the cement-alumina formulation. The viscosity of the final mix is another factor, as it must not be too low or too high. In addition, accelerants, and retarders can be used at selected points during the mold making process steps. Typical individual dispersing alumina with accelerants, and retarders include Almatis ADS-1, ADS-3, and ADW-1.

After mixing, the investment mix was poured in a controlled manner into a vessel that contains the fugitive wax pattern. The vessel provides the external geometry of the mold, and the fugitive pattern generates the internal geometry. The correct pour speed is a further feature, if it is too fast air can be entrapped in the mold, if it is too slow separation of the cement and the alumina particulate can occur. Suitable pour speed range from about 1 to about 20 liters per minute. In one embodiment, the pour speed is about 2 to about 6 liters per minute. In a specific embodiment, the pour speed is about 4 liters per minute.

In a second example, a slurry mixture for making an investment mold consisted of 3000 g of the calcium aluminate cement, (comprising approximately 10% by weight of mayenite, approximately 70% by weight of calcium monoaluminate, and approximately 20% by weight of calcium dialuminmate), 1500 g of calcined alumina particles with a size of less than 10 microns, 2650 g of high-purity calcined alumina bubble of a size range from 0.5-1 mm diameter, 1800 g of deionized water, and 150 g of colloidal silica. The solids-loading of the final mold mix is less than 80%, wherein the solids loading is the total mass solids as a percentage of the total mass of all components in the mix.

The alumina hollow particles provide a mold with a reduced density. The weight fraction of calcium aluminate cement is 42%, and that of the alumina is 58%. This formulation produced a mold that was approximately 125 mm diameter and 400 mm long. The mold was then cured and fired at high temperature. The produced mold was used for casting titanium aluminide-containing articles such as turbine blades with a good surface finish. The roughness (Ra) value was less than 100, and with an oxygen content of less than 2000 ppm. This formulation produced a mold that had a density of less than 1.8 grams per cubic centimeter.

In a third example, a slurry mixture for making an investment mold consisted of 600 g of the calcium aluminate cement, (consisting of approximately 10% by weight of mayenite, approximately 70% by weight of calcium monoaluminate, and approximately 20% by weight of calcium dialuminmate), 300 g of calcined alumina particles with a size of less than 10 microns, 490 g of high-purity calcined alumina bubble of a size range from 0.5-1 mm diameter, 305 g of deionized water, and 31 g of colloidal silica. The solids-loading of the final mold mix is less than about 80%. This formulation produced a smaller mold for a smaller component that was approximately 120 mm diameter and 150 mm long. The mold was then cured and fired at high temperature. The produced mold was used for casting titanium aluminide-containing articles such as turbine blades with a good surface finish. The roughness (Ra) value was less than 100 microinches, and with an oxygen content of less than 1600 ppm.

In a fourth example, a slurry mixture for making an investment mold consisted of 2708 g of the calcium aluminate cement, (comprising approximately 10% by weight of mayenite, approximately 70% by weight of calcium monoaluminate, and approximately 20% by weight of calcium dialuminmate), 1472 g of high-purity calcined alumina bubble of a size range from 0.5-1 mm diameter, 1155 g of deionized water, and 196 g of colloidal silica. This formulation produced a smaller mold with a smaller alumina content for a smaller component. The mold was then cured and fired at high temperature. The produced mold was used for casting titanium aluminide-containing articles such as turbine blades.

The colloidal silica controls the rate of reaction of the calcium aluminate phases with water, and provides mold strength during curing. This rate of reaction of the calcium aluminate phases with water controls the working time of the investment mold mix during mold making. This time was between about 30 seconds and about 10 minutes. If the working time of the investment mold mix is too short, there is insufficient time to make large molds of complex-shaped components. If the working time of the investment mold mix is too long and the calcium aluminate cement does not cure sufficiently quickly, separation of the fine-scale cement and the large scale alumina can occur and this can lead to a segregated mold in which the formulation varies and the resulting mold properties are not uniform.

The three phases in the calcium aluminate cement comprises calcium monoaluminate ($CaAl_2O_4$), calcium dialuminate ($CaAl_4O_7$), and mayenite ($Ca_{12}Al_{14}O_{33}$), and the inventors made this selection to achieve several purposes. First, the phases must dissolve or partially dissolve and form a suspension that can support all the aggregate phases in the subsequent investment mold making slurry. Second, the phases must promote setting or curing of the mold after pouring. Third, the phases must provide strength to the mold during and after casting. Fourth, the phases must exhibit minimum reaction with the titanium alloys that is cast in the mold. Fifth, the mold must have a suitable thermal expansion match with the titanium alloy casting in order to minimize the thermal stress on the part that is generated during post-solidification cooling.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of forming a casting mold for casting a titanium-containing article, said method comprising:
    combining a casting mold composition comprising calcium aluminate cement with a liquid to produce a slurry, the calcium aluminate cement comprising calcium monoaluminate, calcium dialuminate, and mayenite, wherein the mayenite comprises a volume fraction of about 0.01 to about 0.3 of the calcium aluminate cement;
    introducing the slurry into a mold cavity that contains a fugitive pattern; and
    allowing the slurry to cure in the mold cavity to form the casting mold for the titanium-containing article.

2. The method as recited in claim 1, wherein the casting mold composition further comprises oxide particles.

3. The method as recited in claim 2, wherein said oxide particles comprise aluminum oxide particles, magnesium oxide particles, calcium oxide particles, zirconium oxide particles, titanium oxide particles, silicon oxide particles, or compositions thereof.

4. The method as recited in claim 2, wherein said oxide particles comprise hollow oxide particles.

5. The method as recited in claim 4, wherein said hollow oxide particles comprise hollow alumina spheres.

6. The method as recited in claim 2, wherein the oxide particles comprise aluminum oxide particles, and the aluminum oxide particles comprise from about 40% by weight to about 60% by weight of the casting mold composition.

7. The method as recited in claim 1, wherein solids-loading of the slurry is less than 80%.

8. The method as recited in claim 1, wherein the casting mold composition further comprises colloidal silica.

9. The method as recited in claim 1, wherein the calcium monoaluminate comprises a volume fraction of the calcium aluminate cement of about 0.1 to about 0.8, the calcium dialuminate comprises a volume fraction of the calcium aluminate cement of about 0.1 to about 0.6, and the mayenite comprises a volume fraction of the calcium aluminate cement of about 0.01 to about 0.2.

10. The method as recited in claim 1, wherein a volume fraction of the calcium monoaluminate in the calcium aluminate cement is more than about 0.5, and the volume fraction of mayenite in the calcium aluminate cement is less than about 0.15.

11. The method as recited in claim 1, wherein the slurry is introduced into the mold cavity at a rate of about 2 liters per minute to about 6 liters per minute.

12. The method as recited in claim 1, wherein the casting mold comprises an investment casting mold for casting near-net-shape titanium aluminide articles.

13. The method as recited in claim 1, wherein the calcium aluminate cement comprises more than 30% by weight of the casting mold composition.

14. A casting method for titanium and titanium alloy, comprising:
    obtaining an investment casting mold composition comprising calcium aluminate cement and oxide particles, the calcium aluminate cement comprising calcium monoaluminate, calcium dialuminate, and mayenite, wherein the mayenite comprises a volume fraction of about 0.01 to about 0.3 of the calcium aluminate cement;
    pouring said investment casting mold composition into a vessel containing a fugitive pattern;
    curing said investment casting mold composition;
    removing said fugitive pattern from the mold;
    preheating the mold to a mold casting temperature;
    pouring molten titanium or titanium alloy into the heated mold;
    solidifying the molten titanium or titanium alloy and forming a solidified titanium or titanium alloy casting; and
    removing the solidified titanium or titanium alloy casting from the mold.

15. The casting method as recited in claim 14, further comprising heating said mold to a temperature range of about 450 degrees Celsius to about 900 degrees Celsius and allowing said mold to cool therefrom to about room temperature before preheating the mold to the mold casting temperature.

16. The casting method as recited in claim 15, wherein after heating said mold to the temperature range of about 450 degrees Celsius to about 900 degrees Celsius, said mold includes less than 5% volume fraction of aluminosilicates and calcium aluminosilicates.

17. The casting method as recited in claim 14, wherein the removing of the fugitive pattern comprises at least one of melting, dissolution, ignition, oven dewaxing, furnace dewaxing, steam autoclave dewaxing, or microwave dewaxing.

18. The casting method as recited in claim 14, wherein after removing the solidified titanium or titanium alloy casting from the mold, further comprising inspecting with one or both of X-ray radiography and neutron radiography.

19. The casting method as recited in claim 14, wherein the molten titanium or titanium alloy is poured into the heated mold at a rate of about 2 liters per minute to about 6 liters per minute.

20. The casting method as recited in claim 14, wherein a volume fraction of the calcium monoaluminate in the investment casting mold composition is about 0.1 to about 0.8, and the volume fraction of the mayenite in the investment casting mold composition is about 0.01 to about 0.2.

21. The casting method as recited in claim 14, wherein the calcium aluminate cement comprises more than 30% by weight of the investment casting mold composition.

22. The casting method as recited in claim 14, further comprising combining the investment casting mold composition with a liquid to form a slurry, and pouring the slurry into the vessel containing the fugitive pattern.

23. The casting method as recited in claim 22, wherein a solids-loading of the slurry is less than 80%.

* * * * *